United States Patent
Winkle

(10) Patent No.: US 10,486,883 B2
(45) Date of Patent: Nov. 26, 2019

(54) SYSTEMS AND METHODS FOR DELIVERING CLIMATE CONTROLLED PRODUCT

(71) Applicant: Walmart Apollo, LLC, Bentonville, AR (US)

(72) Inventor: David C. Winkle, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/991,704

(22) Filed: May 29, 2018

(65) Prior Publication Data

US 2018/0346225 A1    Dec. 6, 2018

Related U.S. Application Data

(60) Provisional application No. 62/512,852, filed on May 31, 2017.

(51) Int. Cl.
*B65D 81/18*    (2006.01)
*B64C 39/02*    (2006.01)
(Continued)

(52) U.S. Cl.
CPC .......... *B65D 81/18* (2013.01); *B64C 39/024* (2013.01); *B64D 5/00* (2013.01); *G06Q 50/28* (2013.01);
(Continued)

(58) Field of Classification Search
CPC .......... B64C 39/024; B64C 2201/024; B64C 2201/027; B64C 2201/108;
(Continued)

(56) References Cited

U.S. PATENT DOCUMENTS 9,045,234 B2    6/2015 Frolov
9,305,280 B1    4/2016 Berg
(Continued)

FOREIGN PATENT DOCUMENTS

WO    2005062216    7/2005

OTHER PUBLICATIONS

"Artificial Intelligence"; https://web.archive.org/web/20170217163909/ https://en.wikipedia.org/wiki/Artificial_intelligence; Available at least as early as Feb. 17, 2017; pp. 1-23.
(Continued)

*Primary Examiner* — Claude J Brown
(74) *Attorney, Agent, or Firm* — Fitch, Even, Tabin & Flannery LLP

(57) ABSTRACT

In some embodiments, apparatuses and methods are provided herein useful to delivering climate controlled product. In some embodiments, there is provided a system for delivering climate controlled product via at least one autonomous unmanned aircraft system (UAS) that self-evaluates power sufficiency based on temperature tolerance of at least one product including: an autonomous UAS and at least one climate controlled product chamber. The UAS comprising: a control circuit, at least one rotor; a power supply, and a package coupler. The product chamber comprising: a chamber, at least one product reader, and a temperature control mechanism. The control circuit configured to: receive product identifier data; determine at least one climate threshold value; determine a confidence value of sufficient power remaining; compare whether the confidence value is within a risk threshold probability that a first mission will be completed; and initiate supply of power to the at least one rotor.

20 Claims, 9 Drawing Sheets

(51) Int. Cl.
*G06Q 50/28* (2012.01)
*B64D 5/00* (2006.01)

(52) U.S. Cl.
CPC .. *B64C 2201/024* (2013.01); *B64C 2201/027* (2013.01); *B64C 2201/108* (2013.01); *B64C 2201/128* (2013.01); *B64C 2201/141* (2013.01); *B64C 2201/201* (2013.01); *B64C 2201/206* (2013.01)

(58) Field of Classification Search
CPC ........ B64C 2201/128; B64C 2201/141; B64C 2201/201; B64C 2201/206; B64D 5/00; B64D 13/06; B64D 9/00; B64D 2013/0629; B65D 81/18; G06Q 50/28
USPC .......................................................... 244/152
See application file for complete search history.

(56) References Cited

U.S. PATENT DOCUMENTS

| | | | |
|---|---|---|---|
| 9,550,577 | B1 | 1/2017 | Beckman |
| 9,573,684 | B2 | 2/2017 | Kimchi |
| 10,049,236 | B1* | 8/2018 | Alkarmi ................ G06Q 10/08 |
| 10,207,804 | B1* | 2/2019 | Gentry .................... B64D 9/00 |
| 2009/0299534 | A1 | 12/2009 | Ludwig |
| 2014/0149244 | A1 | 5/2014 | Abhyanker |
| 2015/0120094 | A1 | 4/2015 | Kimchi |
| 2015/0277440 | A1 | 10/2015 | Kimchi |
| 2016/0033966 | A1 | 2/2016 | Farris |
| 2016/0196755 | A1 | 7/2016 | Navot |
| 2016/0235236 | A1 | 8/2016 | Byers |
| 2016/0257401 | A1 | 9/2016 | Buchmueller |
| 2016/0272312 | A1 | 9/2016 | Mallard |
| 2017/0110017 | A1 | 4/2017 | Kimchi |
| 2017/0121021 | A1 | 5/2017 | Bonazzoli |
| 2018/0061247 | A1* | 3/2018 | Brown ................ B60L 58/12 |
| 2018/0265222 | A1* | 9/2018 | Takagi ................ G05D 1/102 |
| 2019/0031346 | A1* | 1/2019 | Yong ................ A01M 7/0042 |
| 2019/0135403 | A1* | 5/2019 | Perry ................ B64C 39/024 |

OTHER PUBLICATIONS

Elouarouar, Salwa et al.; "The Energy Autonomy of the Unmanned Aerial Vehicles (UAV)"; https://www.researchgate.net/publication/291520512; Available at least as early as May 10, 2016; pp. 1-5.

Haelle, Tara; "Drone Deliveries of Blood Could Transform Healthcare in Africa"; https://www.forbes.com/sites/tarahaelle/2016/04/12/there-will-be-blood-drone-deliveries-in-africa-could-transform-healthcare/#4fdec2f730b2; Apr. 12, 2016; pp. 1-6.

PCT; App. No. PCT/US2018/033310; International Search Report and Written Opinion dated Aug. 9, 2018.

* cited by examiner

SYSTEMS AND METHODS FOR DELIVERING CLIMATE CONTROLLED PRODUCT

CROSS-REFERENCE TO RELATED APPLICATION

This application claims the benefit of U.S. Provisional Application No. 62/512,852, filed May 31, 2017, which is incorporated herein by reference in its entirety.

TECHNICAL FIELD

This invention relates generally to delivering climate controlled product.

BACKGROUND

Generally, drones are flown by young, old, professional, and/or amateur enthusiasts. These individuals generally fly the drones to play and/or take photos for period of time limited by battery power, usually less than 30 minutes.

BRIEF DESCRIPTION OF THE DRAWINGS

Disclosed herein are embodiments of systems, apparatuses and methods pertaining to delivering climate controlled product via at least one autonomous unmanned aircraft system (UAS). This description includes drawings, wherein.

Figure 1:
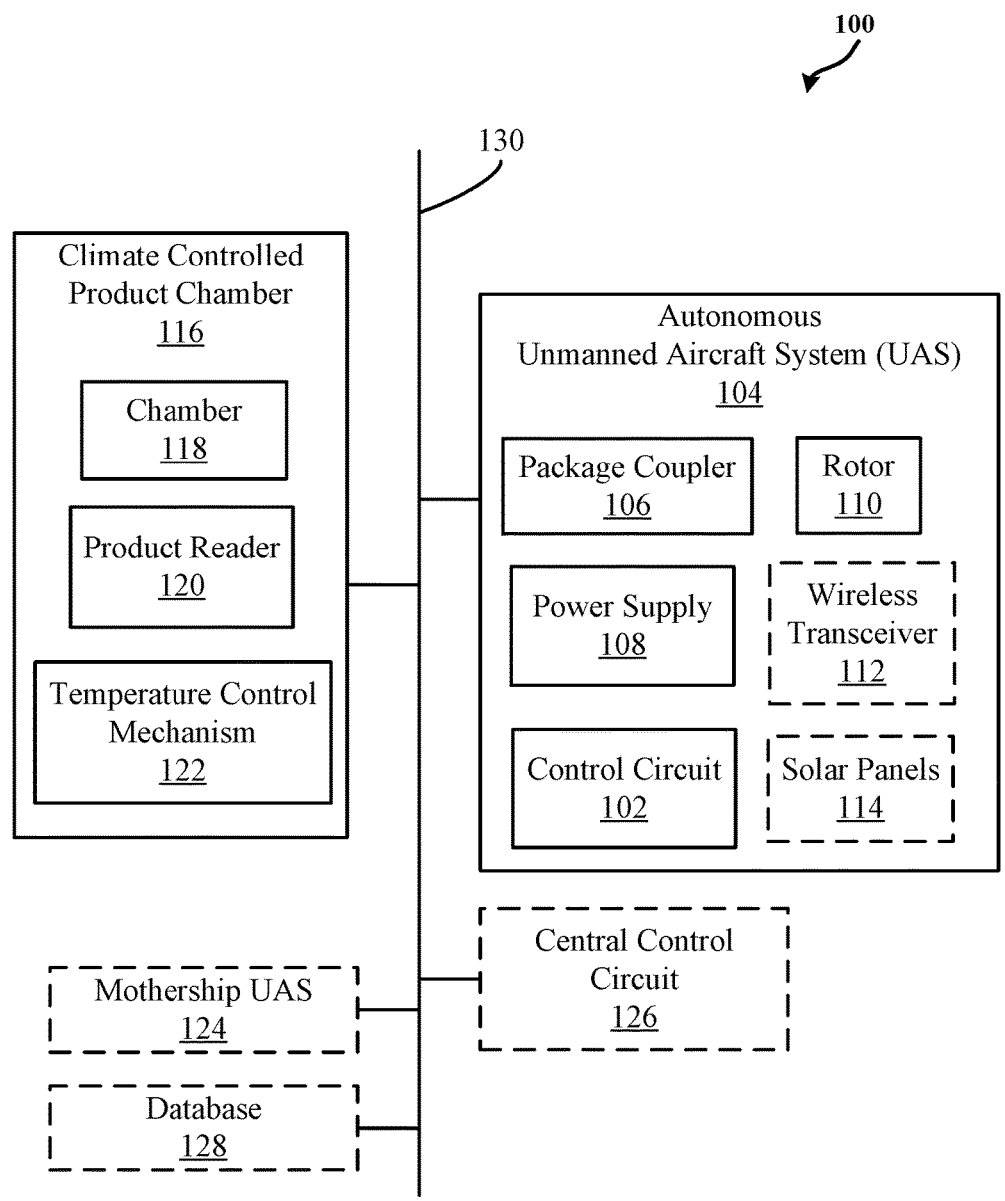
FIG. 1 is an exemplary block diagram of a system for delivering climate controlled product via at least one autonomous unmanned aircraft system (UAS) in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for delivering climate controlled product via at least one autonomous unmanned aircraft system (UAS) that self-evaluates power sufficiency based on temperature tolerance of at least one product. In some embodiments, there is provided a system including an autonomous UAS and at least one climate controlled product chamber that is detachably connectable to a package coupler. The autonomous UAS may comprise: a control circuit that may operate the autonomous UAS; at least one rotor that may provide lift to enable the autonomous UAS to fly; a power supply that may supply power to the at least one of climate controlled product chamber and the at least one rotor; and the package coupler. By one approach, the at least one climate controlled product chamber may comprise: a chamber having a volume that may hold at least one product; at least one product reader that may capture product identifier data associated with the at least one product; and a temperature control mechanism coupled to the power supply when the at least one climate controlled product chamber is connected to the package coupler. In one configuration, the temperature control mechanism may maintain a temperature of the volume of the chamber. By another approach, the control circuit may receive the product identifier data from the at least one product reader. By another approach, the control circuit may determine at least one climate threshold value associated with the product identifier data.

In yet another approach, the control circuit may determine a confidence value of sufficient power remaining based at least on power usage expected by the temperature control mechanism to maintain the temperature of the volume of the chamber within the at least one climate threshold value during a delivery to a delivery location based on flight plan data. In one configuration, the control circuit may compare whether the confidence value of sufficient power remaining is within a risk threshold probability that a first mission of the autonomous UAS will be completed. In another configuration, the control circuit may initiate supply of power to the at least one rotor based on the confidence value of sufficient power remaining being within the risk threshold probability.

In some embodiments, there is provided a method for delivering climate controlled product by an autonomous unmanned aircraft system (UAS). The autonomous UAS may self-evaluate power sufficiency based on temperature tolerance of at least one product. The autonomous UAS includes receiving product identifier data of at least one product from at least one product reader of at least one climate detachable controlled product chamber. In one configuration, the at least one climate detachable controlled product chamber may comprise a chamber having a volume configured to hold the at least one product. By one approach, the method may include determining at least one climate threshold value associated with the product identifier data. By another approach, the method may include determining a confidence value of sufficient power remaining based at least on power usage expected by a temperature control mechanism of the at least one climate detachable controlled product chamber to maintain a temperature of the volume of the chamber within the at least one climate threshold value during delivery to a delivery location. In one configuration, the method may include comparing whether the confidence value of sufficient power remaining is within a risk threshold probability that a first mission of an autonomous UAS will be completed. In another configuration, the method may include initiating supply of power to at least one rotor of the autonomous UAS based on the confidence value of sufficient power remaining being within the risk threshold probability.

As such, apparatuses, systems, and/or methods described herein provide for delivering one or more climate controlled products via at least one autonomous UAS that self-evaluates power sufficiency based at least in part on temperature tolerance of at least one product. As used herein, the term autonomous UAS may refer to at least one flying unmanned vehicle that is configured to carry one or more chambers and/or containers. The chambers and/or containers may store one or more retail products for delivery to one or more retail customers. In some embodiments, a central unmanned vehicle (UV) may be communicatively coupled with the autonomous UAS. Alternatively or in addition to, the central UV may be communicatively coupled with a plurality of autonomous UASs and/or a plurality of unmanned ground vehicle (UGV). In one configuration, a UGV of the plurality of UGVs may have similar functionalities and/or capabilities as the autonomous UAS of the plurality of autonomous UASs. By another approach, the term retail products may refer to goods sold for public use, consumption, and/or resale. The term goods may refer to perishable and/or non-perishable products. Alternatively or in addition to, the autonomous UAS may refer to at least one autonomous UAS capable of completing a delivery mission based on a received mission data with minimal and/or to no guidance from a central control circuit external to the autonomous UAS. By one approach, the at least one autonomous UAS may evaluate power levels locally without a central control circuit and/or a mothership UAS to autonomously determine (based on predicted flight duration, route/flight conditions, predicted temperature control parameters, threshold margin of error, etc.) a predicted and/or determined power level threshold. By another approach, the autonomous UAS is capable of self-evaluation and/or self-assessment of delivery mission readiness, and operational and/or functional capability.

To illustrate, FIGS. 1 through 9 are described below. FIG. 1 illustrates an exemplary block diagram of a system 100 for delivering climate controlled products via an autonomous unmanned aircraft system (UAS), in accordance with some embodiments. In one configuration, one or more of central control circuits and/or motherships may simultaneously and/or substantially at the same time manage a plurality of UAS that deliver climate controlled products. In another configuration, each of the one or more of central control circuits and/or motherships may manage particular one or more of the plurality of UAS based on geographic areas and/or locations.

In some embodiments, the system 100 includes at least one autonomous UAS 104. By one approach, the system 100 may include at least one climate controlled product chamber 116. In one configuration, the climate controlled product chamber 116 may be detachably connectable to a package coupler 106 of the autonomous UAS 104. In another configuration, the autonomous UAS 104 may control, operate, and/or communicate with the climate controlled product chamber 116 via a communication network 130. For example, the communication network 130 may comprise wired and/or wireless network, among other types of network capable of delivering communications between one device to another device using one or more communication protocols. In some embodiments, the autonomous UAS 104 includes a control circuit 102 that operates the autonomous UAS 104. In one configuration, the autonomous UAS 104 may include at least one rotor 110 and corresponding motor that provides lift to enable the autonomous UAS 104 to fly. The autonomous UAS 104 further includes a power supply 108. By one approach, the power supply 108 may supply power to the climate controlled product chamber 116 and the rotor 110. In yet another configuration, the autonomous UAS 104 may include the package coupler 106. In one example, the package coupler 106 may include a power coupler to provide power to the climate controlled product chamber 116 and/or the temperature control mechanism 122. Alternatively or in addition to, the package coupler 106 may include a communication coupling between the autonomous UAS 104 and the climate controlled product chamber 116. As such, one or more control and/or operational data communicated between the autonomous UAS 104 and the climate controlled product chamber 116 may be sent across the network 130 via the package coupler 106. In yet another configuration, the autonomous UAS 104 may include a wireless transceiver 112 coupled to the control circuit 102. In yet another configuration, the autonomous UAS 104 may include solar panels 114 secured to the autonomous UAS 104.

The climate controlled product chamber 116 includes one or more chambers 118 having a volume configured to hold at least one product. In one configuration, the climate controlled product chamber 116 may include at least one product reader 120 that captures product identifier data associated with a product placed within the chamber 118. In one configuration, the climate controlled product chamber 116 may include a temperature control mechanism 122 that may be coupled to the power supply 108 of the UAV when the climate controlled product chamber 116 is connected to the package coupler 106. By one approach, the temperature control mechanism 122 may maintain a temperature of the volume of the chamber 118. In one configuration, the temperature control mechanism 122 couples to and/or may include one or more sensors (not shown) that are secured internally and/or externally around the chamber 118 to detect the temperature of the volume of the chamber 118. The one or more sensors may provide temperature data to the temperature control mechanism 122 and/or the control circuit 102. By one approach, the control circuit 102 may provide temperature control data to the temperature control mechanism 122 used by the temperature control mechanism to control and to adjust the temperature of the volume of the chamber 118 within a threshold temperature range. The threshold temperature range may correspond to a temperature range particular to the at least one product stored in the chamber 118. In one configuration, the threshold temperature range may comprise an average temperature range of multiple different temperature ranges each corresponding to one of multiple products within the chamber 118 and/or a particular temperature range that may include one or more storage temperatures associated with the at least one product in the chamber 118. In one configuration, the one or more storage temperatures may be based, at least in part, on published industry and/or government guidelines for storing the at least one product, customized guidelines by one or more retailers, and/or customized guidelines particular to the climate controlled product chamber 116. In such a configuration, the temperature range may comprise one or more temperatures associated with most extreme temperatures associated with storage of the at least one product. Alternatively or in addition to, when the control circuit 102 and/or the temperature control mechanism 122 determines that one or more temperatures of the most extreme temperatures conflict with the other of the most extreme temperatures, the control circuit 102 may provide temperature conflict data to a central control circuit 126 indicating that one or more of the at least one product is to be reassigned to another autonomous UAS and/or another climate controlled product chamber. By one approach, the control circuit 102 may provide product identifier data associated with the one or more of the at least one product to be reassigned to the central control circuit 126. Alternatively or in addition to, the central control circuit 126 may determine storage temperature conflicts with the at least one product prior to assigning placement of the at least one product in the climate controlled product chamber 116. As such, when the climate controlled product chamber 116 is assigned to the autonomous UAS 104, the temperature range that may be determined and/or calculated by the control circuit 102 and/or the temperature control mechanism 122 may not result in a temperature range that may be suitable to one of the at least one product and not suitable to another one of the at least one product.

By another approach, the temperature control mechanism 122 may receive the temperature control data. In one configuration, the temperature control mechanism 122 may operate heating and/or cooling elements of the temperature control mechanism 122 to adjust, for a first time, the temperature of the chamber 118 based on the temperature control data. In another configuration, the temperature control mechanism 122 may receive the temperature data from the one or more sensors after a period of time. To ensure that the adjustment of the temperature at the first time brought the temperature at and/or a threshold within the threshold temperature range, the control circuit 102 and/or the temperature control mechanism 122 may receive the temperature data from the one or more sensors subsequent to the first time. When the temperature is not within the threshold temperature range, the temperature control mechanism 122 may adjust, for a second time, the temperature of the chamber 118. In another configuration, the temperature control mechanism 122 may continue to adjust the temperature of the chamber 118 by operating the heating and/or cooling elements until, after a subsequent receipt of the temperature data, the control circuit 102 determines that the temperature of the chamber 118 is within the threshold temperature range. By one approach, the temperature control mechanism 122 may comprise a cold and/or hot plate device, an aerosol spray cooling device, evaporative cooling system, cryogenic cooling system, a vortex cooling device, and/or the like having capability to affect the temperature of the chamber 118.

By one approach, the at least one product reader 120 may comprise at least one bar code reader, optical reader, radio frequency identifier (RFID) tag reader, among other devices that may read and/or detect identification data associated with products. The at least one product reader 120 may be conveniently secured at an area of the chamber 118 and/or the climate controlled product chamber 116 that facilitate capturing the product identifier data associated with the at least one product. For example, as an associate of a retailer, a conveyor system, and/or a loader device places the at least one product into the chamber 118, the at least one product reader 120 may capture the product identifier data of the at least one product. In another example, the at least one product reader 120 may capture the product identifier data in response to a read data signal provided by the control circuit 102. The read data signal may trigger the at least one product reader 120 to capture the product identifier data of the at least one product inside the chamber 118. In one configuration, the control circuit 102 may receive the product identifier data and/or determine the at least one product based on the product identifier data. In another configuration, the control circuit 102 may access at least one of one or more databases 128 to determine storage temperatures associated with the at least one product. Based on the storage temperatures, the control circuit 102 may determine the threshold temperature range particular to the at least one product.

In some embodiments, the system 100 may include the central control circuit 126 that is communicatively coupled with the autonomous UAS 104 via the communication network 130. By one approach, the central control circuit 126 may be external to the autonomous UAS 104. By another approach, the central control circuit 126 and/or the autonomous UAS 104 may be coupled to and/or capable of accessing the one or more databases 128. The central control circuit 126 may correspond to a central computer server, a mothership unmanned vehicle (UV), and/or the like. In one configuration, the central control circuit 126 may provide one or more flight plan data (e.g., the flight plan data) to a plurality of autonomous UAS including the autonomous UAS 104 and/or a plurality of unmanned ground vehicles (UGVs). By one approach, the one or more flight plan data may comprise at least one or more mission parameters including product delivery information associated with one or more delivery missions. Alternatively or in addition to, the one or more flight plan data may comprise temperature requirements of a plurality of products to be delivered, characteristics of a plurality of climate controlled product chambers including the climate controlled product chamber 116, maps, one or more routing plans, delivery constraints, delivery choices, payment of delivery, and/or pickup and/or return requirements, among other data that may be usable to plan and/or deliver climate controlled products via one or more autonomous UAS and/or any UVs. In some embodiments, the central control circuit 126 may capture one or more delivery events information, provide data exceptions associated with operations and/or communications with the UVs, log data associated with the UVs, and/or status information, among other functions and/or capability particular to the central control circuit 126. For example, the central control circuit 126 may capture changes to the delivery missions and/or the flight plan data by the autonomous UAS 104. By one approach, the autonomous UAS 104 may modify the flight plan data and/or the delivery missions based on events that may occur during one or more deliveries. The events may comprise information and/or happenings during the deliveries that may result in one or more deviations from the flight plan data and/or the delivery missions.

In one configuration, the central control circuit 126 may use the events for trend analysis, mission improvements, mission tracking, capability improvement, and/or the like. The central control circuit 126 may create and/or build the mission parameters based, at least in part, on order processing and/or, fulfilment and routing processes, among other processes and/or activities associated with retail stores and/or retail orders. By another approach, the mission parameters may be modified by the central control circuit 126 and/or the control circuit 102 as order details are received or modified in response to environmental conditions and/or event information. In one configuration, the event information may comprise holidays, emergency activity, business/marketing requirements, and/or the like. By another approach, the central control circuit 126 may access at least one of the databases 128 to determine package and/or product characteristics of at least one of the at least one product, regulations, delivery location information, routing and/or flight path information, and/or other such information. The at least one of the databases 128 may correspond to a product database and/or a database associated with at least one inventory management system, among other databases associated with a retail store and/or a distribution center. By another approach, the mothership UAS may comprise the central control circuit 126.

Figure 2:
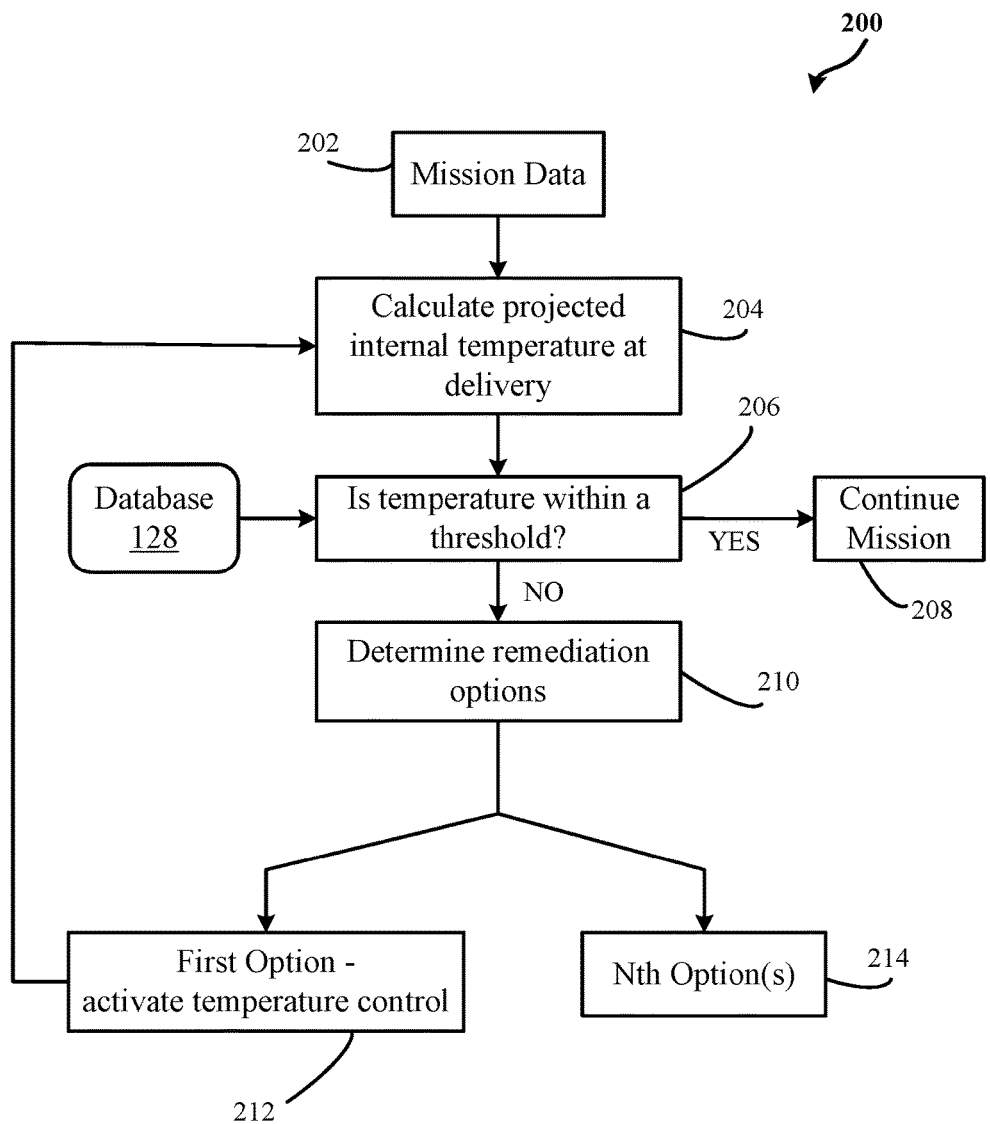
FIG. 2 is an exemplary flow diagram of a process for delivering climate controlled product via at least one autonomous UAS in accordance with some embodiments.
Figure 3:
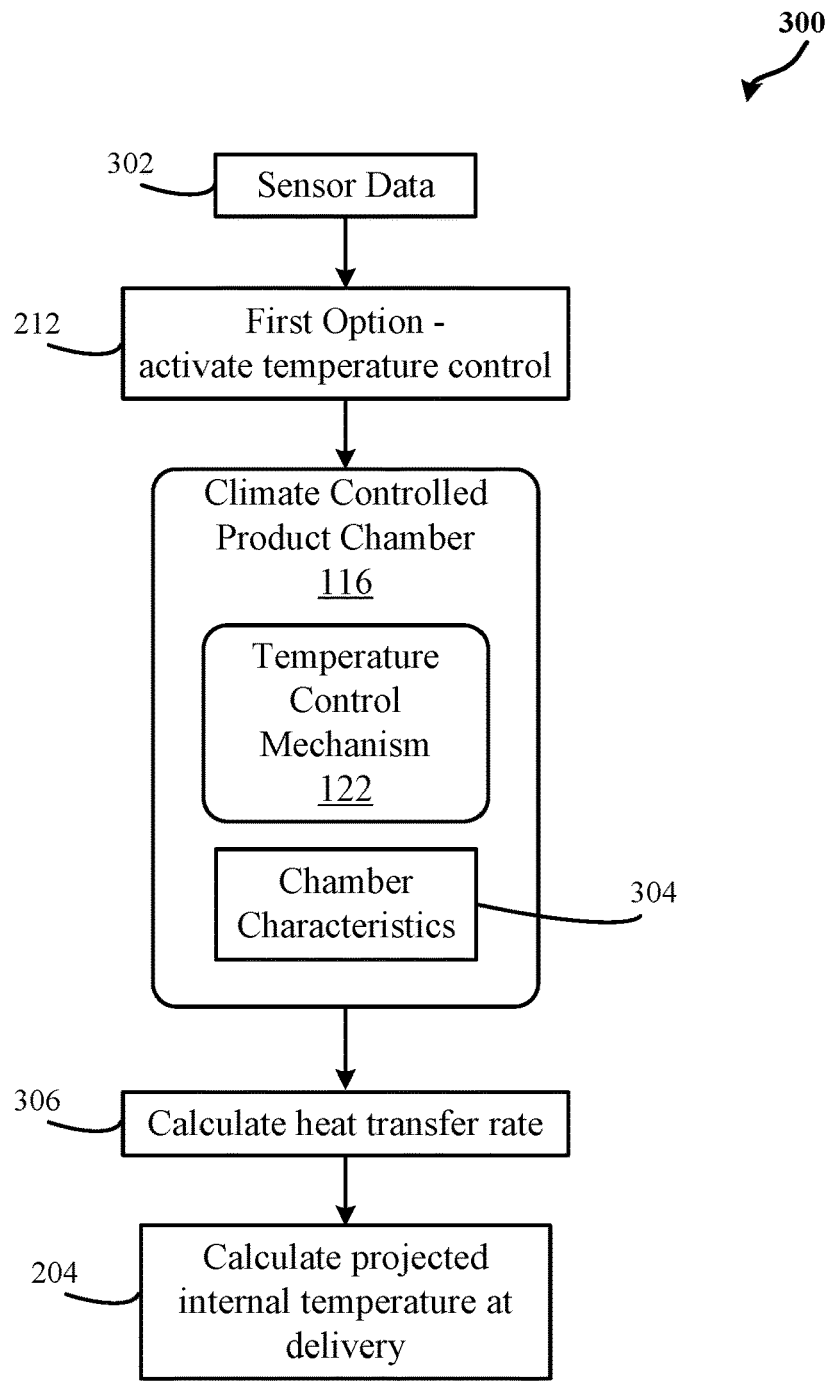
FIG. 3 is an exemplary flow diagram of a process for delivering climate controlled product via at least one autonomous UAS in accordance with some embodiments.
Figure 4:
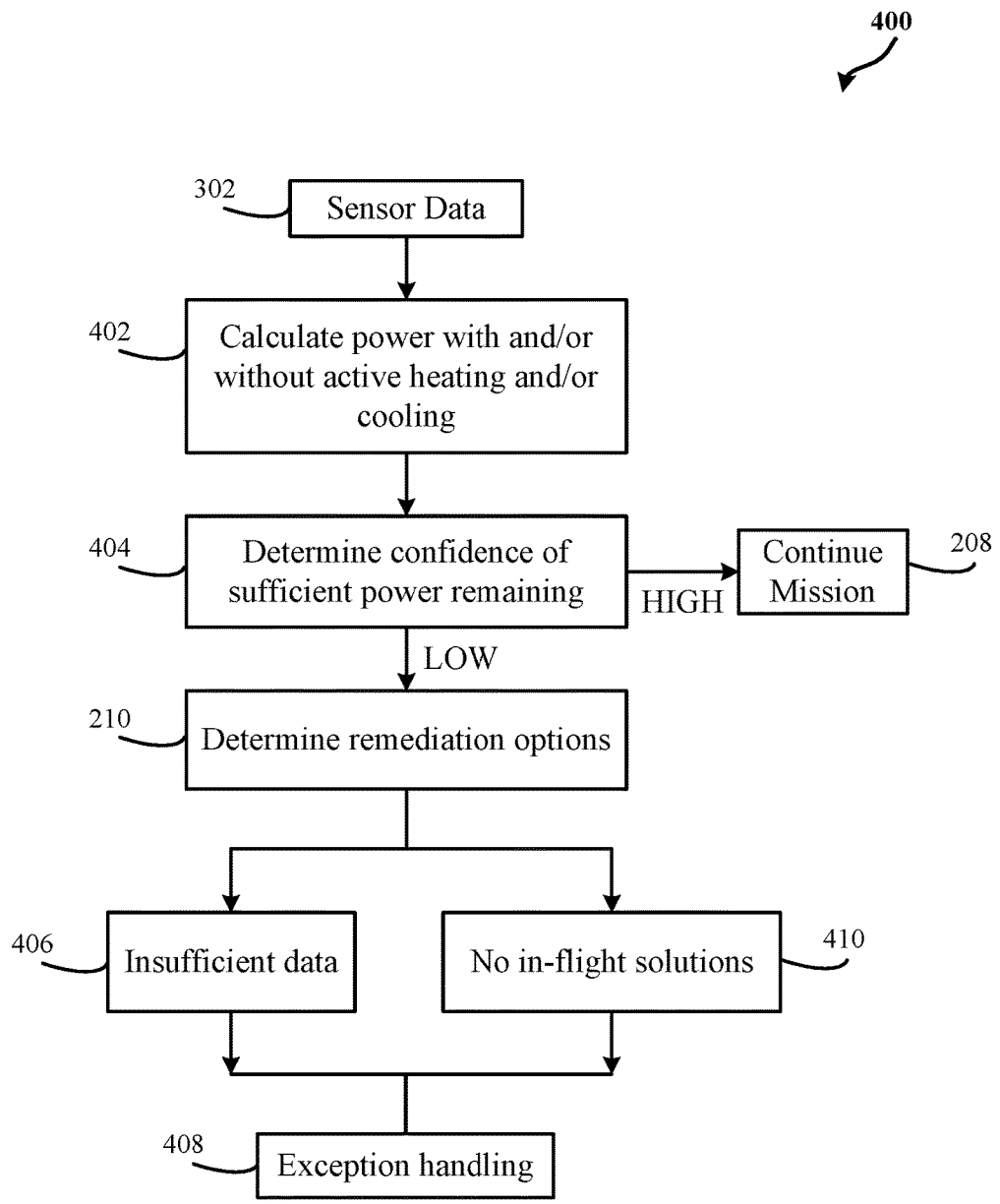
FIG. 4 is an exemplary flow diagram of a process for delivering climate controlled product via at least one autonomous UAS in accordance with some embodiments.

To further illustrate, FIG. 1 is further described in conjunction with one or more steps of FIGS. 2 through 4. Each of FIGS. 2 through 4 is an exemplary flow diagram of a process for delivering climate controlled product via at least one autonomous UAS, in accordance with some embodiments. In some embodiments, the control circuit 102 may receive the product identifier data from the product reader 120. By one approach, the control circuit 102 may receive mission data, at step 202. In one configuration, the mission data may comprise product identifier data, mission parameters, flight plan data, delivery missions, and/or data associated with planning, executing, and/or delivery of one or more products. For example, the control circuit 102 may receive the product identifier data associated with the at least one product, the flight plan data comprising mission parameters associated with the delivery of the at least one product.

By another approach, the control circuit 102 may determine at least one climate threshold value associated with the product identifier data. The at least one climate threshold value may be determined based, at least in part, on the product identifier data associated with the at least one product, and/or temperature ranges and/or values associated with the at least one product in accordance with governmental regulatory requirements, retailers, and/or manufacturer recommendations, among other industry standards associated with storage of the at least one product. In one configuration, the control circuit 102 may access at least one of the databases 128 including a plurality of temperature ranges and/or values for a plurality of products based on governmental regulatory requirements, retailers, and/or manufacturer recommendations, among other industry standards associated with storage of the plurality of products. The control circuit 102 may determine a particular temperature range and/or value associated with the at least one product based on the access to the at least one of the databases 128. By one approach, the control circuit 102 may determine the at least one climate threshold value based, at least in part, on the determined particular temperature range and/or value.

By another approach, the determination of the at least one climate threshold value may be based, at least in part, on a calculated projected internal temperature at delivery. In one configuration, at step 204, the control circuit 102 may calculate the projected internal temperature at delivery based, at least in part, on heat transfer rate and/or surface area of the at least one climate controlled product chamber 116 and/or the chamber 118. In one configuration, the projected internal temperature may be calculated periodically. By one approach, the periodic calculation may correspond to calculating over a period of time that may result in a high probability of completing the delivery missions within the at least one climate threshold value. In another configuration, the projected internal temperature may be calculated in response to changes in situations during a delivery and/or execution of the flight plan data. In another configuration, the projected internal temperature may be manually configurable. At step 206, the control circuit 102 may determine whether the temperature of the volume of the chamber 118 is within the at least one climate threshold value. By one approach, the determination of whether the temperature of the chamber 118 is within the at least one climate threshold value may comprise comparing the calculated projected internal temperature at delivery with the at least one climate threshold value. In one configuration, when the calculated projected internal temperature at delivery is within, at, and/or less than the at least one climate threshold value, the autonomous UAS 104 may, at step 208, continue with the flight plan data and/or the delivery missions.

In another configuration, when the calculated projected internal temperature at delivery is greater than the at least one climate threshold value, the control circuit 102 may, at step 210, at least one determine remediation option based, at least, on the mission parameters. By one approach, the control circuit 102 may compare a plurality of determined remediation options with a plurality of calculated projected internal temperatures at delivery. By one approach, the plurality of calculated projected internal temperatures at delivery may vary based on whether the temperature control mechanism 122 is activated or not by the control circuit 102. By another approach, the control circuit 102 may determine each of the remediation options for each mission parameters associated with the flight plan data. In such an approach, the control circuit 102 may compare each of the remediation options with each of the plurality of calculated projected internal temperatures at delivery to determine a particular remediation option that would result in a high probability of completing the delivery missions within the at least one climate threshold value. In one configuration, the determination of the particular remediation option may be based on at least one of cost of remediation, value associated with the at least one product in the chamber 118, available charging options for the power supply 108 (e.g., in-flight charging, mobile relay stations, retail stores, or the like), other autonomous UAS that may become a resource to execute a portion of the delivery mission, and/or delivery parameters (e.g., available time left for delivery, priority associated with the at least one product, and/or other delivery parameters that may affect the mission delivery and/or the flight plan data), among other factors that may contribute to determining the particular remediation option.

In some embodiments, the particular remediation option may correspond to activating temperature control, at step 212. By one approach, the particular remediation option may correspond to other remediation option, at step 214. In one example, the other remediation option may correspond to a flight path optimization including adjusting flight speed and/or changing route, among other possible options to bring the calculated projected internal temperature at delivery within, at, and/or less than the at least one climate threshold value.

By one approach, activation of the temperature control may trigger the control circuit 102 to receive, at step 302, sensor data from at least one sensor associated with the climate controlled product chamber 116 and/or the autonomous UAS 104. In one configuration, the sensor data may comprise the product identifier, the temperature of the chamber 118, environmental data (e.g., temperature, wind, and/or the like projected during the delivery), availability of power to the autonomous UAS 104, among other sensor data that may contribute to controlling and/or maintaining the temperature in the chamber 118. By another approach, the control circuit 102 may provide temperature control data to the temperature control mechanism 122 and/or the climate controlled product chamber 116 based on the sensor data.

By another approach, the control circuit 102 may modify the temperature control data based on a determination of chamber characteristics, at step 304. The control circuit 102 may have a plurality of options to determine the chamber characteristics. For example, the determination of the chamber characteristics may be based, in part, on characteristics of insulation materials used inside and/or outside the chamber 118 and/or physical dimensions of the climate controlled product chamber 116 and/or the chamber 118. By one approach, the central control circuit 126 may provide the chamber characteristics to the control circuit 102. For example, the central control circuit 126 may provide the chamber characteristics to the control circuit 102 as part of the mission parameters.

By another approach, the control circuit 102 may receive at least one container identifier associated with the climate controlled product chamber 116 from the product reader 120. As such, the control circuit 102 may send a lookup request to the central control circuit 126 to determine the chamber characteristics associated with the at least one container identifier. The at least one container identifier may comprise radio frequency identification (RFID), bar codes, and/or the like. By another approach, the at least one container identifier may comprise the chamber characteristics.

By another approach, the control circuit 102 may determine the chamber characteristics based on chamber characteristics of previously coupled one or more other climate controlled product chambers. For example, the one or more other climate controlled product chambers may have stored one or more products similar to the at least one product. In another example, the one or more other climate controlled product chambers may have been used during one or more mission deliveries and/or flight plan data that are similar to the mission delivery and/or the flight plan data associated with the at least one product.

By another approach, the control circuit 102 may receive the chamber characteristics from other autonomous UAS. On a separation occasion, the other autonomous UAS may have coupled with the climate controlled product chamber 116 and, thus, stored the chamber characteristics of the climate controlled product chamber 116. As such, the control circuit 102 may send a data request to the other autonomous UAS requesting the chamber characteristics associated with the at least one container identifier of the climate controlled product chamber 116. In response, the other autonomous UAS may provide the chamber characteristics to the control circuit 102.

By another approach, the control circuit 102 may perform image analysis of the climate controlled product chamber 116 based on sensor data received from one or more optical sensors secured to the climate controlled product chamber 116 and/or the autonomous UAS 104. The sensor data may correspond to 3D-scanned data of the one or more optical sensors. By one approach, the control circuit 102 may compare resulting chamber data from the image analysis to a plurality of chamber data in one of the databases 128 to determine the chamber characteristics of the climate controlled product chamber 116. In such an approach, the one of the databases 128 may correspond to a product database including the plurality of chamber data. Thus, the control circuit 102 may determine the chamber characteristics based on the comparison.

By another approach, the control circuit 102 may determine the chamber characteristics of the climate controlled product chamber 116 based on a calculated heat transfer rate of the climate controlled product chamber 116 and/or chamber 118. As such the control circuit 102 may access one of the databases 128 to determine which one of stored plurality of climate controlled product chambers has heat transfer rate similar to the calculated heat transfer rate of the climate controlled product chamber 116 and/or chamber 118. Thus, at step 306, the control circuit 102 may calculate heat transfer rate of the climate controlled product chamber 116 and/or chamber 118, at step 306. By one approach, the calculated heat transfer rate may be input to a calculation of the projected internal temperature at delivery, at step 204. The control circuit 102 may calculate the heat transfer rate based, at least in part, on at least one of surface area, insulation rating, thermal conductivity, thickness, internal temperature, time, and/or external temperature of the climate controlled product chamber 116 and/or chamber 118.

By another approach, the control circuit 102 may determine, at step 404, a confidence value of sufficient power remaining based at least on power usage expected by the temperature control mechanism 122 to maintain the temperature of the volume of the chamber 118 within the at least one climate threshold value during a delivery to a delivery location based on the flight plan data. In some embodiment, the confidence value of sufficient power remaining may be based on a forward looking probability that available power may be enough to complete one or more delivery missions as planned and, may, subtract a probability of additional power to support the one or more delivery missions due to unplanned conditions (e.g., autonomous UAS break down, communication problems, weather, wind, traffic, higher priority deliveries, processing problems, and/or other type of problems that may be encountered during delivery of products). As such, the confidence value of sufficient power remaining may have a first value when there is no projected occurrence of unplanned conditions. In a non-limiting example, the first value may correspond to 95%. Alternatively or in addition to, when other factors may increase chances (e.g., risk) of unplanned conditions occurring, for example, the confidence value of sufficient power remaining may be less than or equal to a second value of a chance that available power will be insufficient. In a non-limiting example, the second value may correspond to 25%. As such, when the confidence value of sufficient power remaining may be less than or equal to the second value, the control circuit 102 may send a mission change request to the central control circuit 126. The central control circuit 126, in response, may provide another mission data (and/or another flight plan data) and/or modified mission data (and/or modified flight plan data) to the control circuit 102. As such, the confidence value of sufficient power remaining may be used by control circuit 102, for example, to evaluate whether or not making a flight plan change and/or whether or not activating the temperature control mechanism 122 places the remaining one or more delivery missions at risk due to insufficient power. By one approach, the confidence value of sufficient power remaining may be associated with one of three risk designations: high risk, moderate risk, and low risk. High risk may correspond to a confidence value that is less than and/or equal to a third value. The third value may correspond to a high probability of insufficient power. Moderate risk may correspond to a confidence value that is less than and/or equal to a fourth value but greater than the third value. The fourth value may correspond to a low probability of insufficient power.

Low risk may correspond to a confidence value that is greater than the fourth value. By one approach, the flight plan data may include the third value and the fourth value. The third and fourth values may be predetermined values based on one or more orders associated the at least one product. For example, the predetermined values may be based on priorities assigned to the one or more orders, importance of ensuring delivery of the at least one product, business criteria(s), among other possible business-based, situational-based, and/or client-based factors. In one configuration, the risk threshold probability may be included in the flight plan data and/or mission parameters provided to the control circuit 102 by the central control circuit 126 and/or the mothership UAS 124. Alternatively or in addition to, the risk threshold probability may be provided to the control circuit 102 by the central control circuit 126 and/or the mothership UAS 124 at a different time than the flight plan data and/or the mission parameters. By one approach, the central control circuit 126 and/or the mothership UAS 124 may periodically provide the risk threshold probability to the control circuit 102 based on one or more changes to the flight plan data and/or the mission parameters. As such, the risk threshold probability may change based on the one or more changes to the flight plan data and/or the mission parameters. For example, a change to the flight plan data and/or the mission parameters may correspond to, for example, a deviation from an original flight path due to one of the unplanned conditions occurring. In response, the risk threshold probability may change based on one of the unplanned conditions occurring. As such, the central control circuit 126 may communicate to the control circuit 102 the changed risk threshold probability through the changed flight plan data and/or mission parameters, and/or through a communication separate from the changed flight plan data.

In one implementation, the control circuit 102 may associate the confidence value of sufficient power remaining with the one of three risk designations based on the third value and the fourth value. In response to the association, the control circuit 102 may compare and/or determine whether the confidence value of sufficient power remaining is within the risk threshold probability. Alternatively or in addition to, the control circuit 102 may compare whether a particular risk designation associated with the confidence value matches with the risk threshold probability. As such, the risk threshold probability may comprise a type of risk (e.g., high risk, moderate risk, low risk, etc.) and/or a value or a range of values associated with the type of risk. Thus, the confidence value of sufficient power remaining being within the risk threshold probability may correspond to a high likelihood that a mission of the autonomous UAS 104 will be completed.

In another implementation, the confidence value of sufficient power remaining being within the risk threshold probability may trigger the control circuit 102 to initiate the delivery and thus initiate supply of power to the at least one rotor. As such, the rotor 110 may start providing lift to enable the autonomous UAS 104 to start flying. By one approach, an association of the confidence value with a risk designation corresponding to the low risk may trigger the control circuit 102 to initiate supply of power to the at least one rotor. By another approach, an association of the confidence value with a risk designation corresponding to the moderate risk may trigger the control circuit 102 to determine from the flight plan data and/or the communication separate from the changed flight plan data the risk threshold probability associated with the delivery mission. As such, depending on the determination, the control circuit 102 may initiate supply of power to the at least one rotor when the calculated confidence value is within the risk threshold probability associated with the delivery mission.

Alternatively or in addition, the determination of the confidence value of sufficient power remaining may be based on estimated power usage to complete the mission with and/or without activating the temperature control mechanism 122, probability of variance in design factors, probability of changes to mission factors, probability of variations in operational factors, and/or observed values, among other factors that may affect the confidence value. In one scenario, a mission (e.g., a delivery mission) may be completed when delivery of the at least one product is complete. Alternatively or in addition to, the mission may be completed when the delivery is completed and the autonomous UAS 104 is at a home location.

By one approach, the control circuit 102 may calculate, determine, and/or estimate power usage to complete the mission with and/or without activating the temperature control mechanism 122 based, in part, on design factors, mission factors, and/or operational factors. In one configuration, the design factors may comprise reference values associated with functional and/or technical design of the autonomous UAS 104 (e.g., whether the autonomous UAS 104 may supply intermittent or continuous power to the at least one climate controlled product chamber 116 based on a previous power usage and/or designed power usage of a particular combination of the autonomous UAS 104 with the at least one climate controlled product chamber 116). In another configuration, the mission factors may comprise characteristics of the at least one climate controlled product chamber 116 (e.g., weight, physical shape, physical dimension, among other type of characteristics that may be associated with a controlled product chamber), and/or flight plan (e.g., allotted delivery time, duration, speed, and/or altitude, among other characteristics that may be associated with the flight plan). In another configuration, the operational factors may comprise sensor data received by the control circuit 102, at step 302, communication protocols used to communicate, processing power of the control circuit 102, and/or degree of control to components (e.g., signature pad, cargo manipulation, lighting, user interface, among other type of components that may be associated with an autonomous UAS). Alternatively or in addition to, the control circuit 102 may calculate, determine, and/or estimate power usage to complete the mission based, in part, on reference values stored in a memory of the autonomous UAS 104, previous power usage stored in the memory, and/or estimated power usage based on the reference values. In one example, the reference values may be values predetermined by a manufacturer and/or designed to be used by the autonomous UAS 104 to determine expected power usage to complete one or more delivery missions. In another example, the previous power usage may be based on one or more actual power usage associated with one or more previous mission deliveries of the autonomous UAS 104. In another example, the one or more previous mission deliveries may be associated with the at least one climate controlled product chamber 116. In another example, the estimated power usage may be based on previous power usage of one or more other autonomous UAS s.

By another approach, the probability of variance in design factors may be based, in part, on age of the power supply 108 and/or whether or not maintenance and/or calibration of the autonomous UAS 104 is up-to-date or overdue. By another approach, the probability of changes to mission factors may be based, in part, on probability of changes to flight plan data, probability of weather forecast variance, and/or probability of cargo characteristics varying from expected. By another approach, probability of variations in operational factors may be based, in part, on probability of higher operational power for sensors, communications, processing, and/or other factors associated with operation of the autonomous UAS 104 may be predicted based on historical data, location, time, and/or events.

In some embodiments, determinations of remediation options, at step 210, may not be possible due to insufficient data and/or no in-flight solutions. By one approach, the control circuit 102 may determine that one or more inputs, options, and/or data to determine a remediation option may be insufficient and/or unavailable, at step 406. By another approach, at step 410, the control circuit 102 may determine that there is no in-flight solutions available based on a self-diagnostic assessment performed by the control circuit 102. The self-diagnostic assessment may comprise predetermined self-test performed by the autonomous UAS 104 based on remediation options determined at step 210. For example, the control circuit 102 may determine that the power usage expected by the temperature control mechanism 122 may result in a confidence value that is not within the risk threshold probability. As such, the control circuit 102 may access local data and/or communicate with the central control circuit 126 to determine whether there at least one charging option available during the delivery. In one configuration, the control circuit 102 may receive communication with the central control circuit 126 indicating that there is no charging option that may be available during the delivery. In another example, the control circuit 102 may determine that the temperature control mechanism 122 may intermittently apply power to maintain the temperature of the chamber 118. However, despite the intermittent application of power, the confidence value may still not be within the risk threshold probability. As such, at step 410, the control circuit 102 may communicate with the central control circuit 126 to determine charging option that may be available during the delivery. When the control circuit 102 receives a communication with the central control circuit 126 indicating that there is no charging option available during the delivery, the control circuit 102 may perform exception handling, at step 408. In one configuration, at step 408, the control circuit 102 may recognize that the autonomous UAS 104 may not complete delivery of the at least one product and/or cannot maintain the temperature in the chamber 118 if the delivery were to proceed. The control circuit 102 may determine the best alternate course of action based, at least in part, on previous actions taken during similar situational conditions and/or environments, order detail, customer profile, order history, resource availability, current event, and/or business criteria, among other factors that may be usable to determine the alternate course of action. In one configuration, the business criteria may be associated with deliverables, operational metrics, financial metrics, and/or the like. For example, the business criteria may comprise priority assigned to the at least one product, value assigned to customer satisfaction and/or retention, ease of choosing one course of action over another course of action, etc. In an illustrative non-limiting example, the control circuit 102 may determine that the autonomous UAS 104 may not complete delivery due to inability to maintain the temperature in the chamber 118. The control circuit 102 may determine and/or identify a particular remediation option by determining from the mission parameters and/or the flight plan data an assigned business criteria associated with the at least one product. As such, if the assigned business criteria correspond to a high delivery priority, the control circuit 102 may communicate with the central control circuit 126 by providing a transfer request of the climate controlled product chamber 116 to another autonomous UAS. Alternatively or in addition to, the transfer request may indicate a request to transfer one or more particular product of the at least one product that is associated with the assigned business criteria corresponding to the high delivery priority.

Alternatively or in addition to, the control circuit 102 may receive intelligence factors from the central control circuit 126 and/or access one of the database 128 to determine the best alternate course of action. By one approach, the best alternate course of action may be determined based, in part, on the intelligence factors. The intelligence factors may comprise data corresponding to previous missions, current events, the business criteria, and/or customer insights. The control circuit 102 may determine which intelligence factors to use and/or apply by identifying and/or prioritizing relationships between current situation and available data such as previous missions, current events, business criteria and/or customer insights. In one configuration, an intelligence factor may be relevant if there is a chance of impact to the delivery mission. For example current events such as holidays, calendars, news, weather, or sporting events may be relevant because there may be an increase in traffic or routes that may become unavailable. In another example, current events may be relevant because certain items may have higher priority during particular events where delivering on an alternate day may nullify the value to the customer. In one example, value may be intrinsic value such as prescriptions or food where spoilage may render something useless. In another example, value may be perceived and/or subjective, for example, flowers may lose value from a customer's perspective if delivered two days after Valentine's Day. In another configuration, impact to the delivery mission may result from events that may be identified by the central control circuit 126 and/or inferred by the control circuit 102. In another configuration, value may be defined by a business objective such as branding or reputation. For example a mission value may correspond to a timely delivery ensuring customer satisfaction, retention and/or customer replacement. In another configuration, value may be the cost of cargo or delivery. In another configuration, priority may be a business defined criteria which may be included in the delivery mission and/or may be provided for the purpose of remediation decisions and/or may be inferred by the control circuit 102 based on one or more business strategies. For example, a retailer's everyday low prices motto may be used by the control circuit 102 to set a medium priority to cost, and/or value to a customer may be used by the control circuit 102 to prioritize customer satisfaction over cost to the retailer. By one approach, the intelligence factors may be used when there is no in-flight option to remediate temperature and/or a solution external to the autonomous UAS 104 that may be identified.

In some embodiments, sufficient power remaining may refer to the autonomous UAS 104 having an ability to complete one or more delivery missions and return to the home location (e.g., the mothership UAS 124, a distribution center, a UAS main location, a retailer, among other types of locations that may be associated with as home location to an autonomous UAS). For example, the home location may comprise original launch point and/or one or more designated home base, distribution facility, store, vehicle, mothership, to name a few. The confidence value of sufficient power remaining may comprise an estimated likelihood and/or quantified risk ranking that may be influenced by potential unplanned events or changes. If the calculated confidence value exceeds a risk threshold probability, the control circuit 102 may determine and/or evaluate one or more remediation options. For example, at step 210, when the confidence value of sufficient power remaining is not sufficient to maintain the temperature of the volume of the chamber 118 within the at least one climate threshold value during the delivery, the control circuit 102 may determine the remediation options based, at least, on the mission parameters included in the flight plan data. When the probability of success of completing the delivery mission is within the risk threshold probability, the delivery mission may be allowed to continue. For example, at step 208, when the confidence value of sufficient power remaining is sufficient to maintain the temperature of the volume of the chamber 118 within the at least one climate threshold value during the delivery, the autonomous UAS 104 continues with the flight plan data and/or the delivery missions. Thus, the control circuit 102 may compare whether the confidence value of sufficient power remaining is within a risk threshold probability that a first mission of the autonomous UAS 104 will be completed.

In some embodiments, the control circuit 102 may determine sufficient power remaining based, at least in part, on at least one of expected (e.g., estimate) and/or actual power usage (e.g., consumption) of the temperature control mechanism 122 in maintaining the temperature of the volume of the chamber 118 within the at least one climate threshold value during a delivery. In one configuration, the expected power usage may be based on previous power consumptions of one or more previous delivery missions executed by the autonomous UAS 104. By one approach, the expected power usage may vary from mission to mission and/or within the mission as a result of changes to flight plan data, cargo, maintenance condition, events, environment, and/or design variations. As such, actual mileage traveled by the autonomous UAS 104 during a delivery may vary. By one approach, one or more changes to any of factors, data, and/or values received by the control circuit 102 that affect an initial determination of the expected power usage may trigger the control circuit 102 to re-determine the expected power usage. As such, one or more possibility of changes to one or more of the factors, data, and/or values may trigger the control circuit 102 to determine, at step 404, the confidence value of sufficient power remaining and/or to compare whether the confidence value of sufficient power remaining is within the risk threshold probability that the delivery mission of the autonomous UAS 104 may be completed.

By yet another approach, the control circuit 102 may initiate supply of power to the rotor 110 based on the confidence value of sufficient power remaining being within the risk threshold probability. In one configuration, the risk threshold probability may be based on a business criteria received from the central control circuit 126. The business criteria may correspond to one of the business criteria previously described.

In some embodiments, in response to the comparison that the confidence value of sufficient power remaining is not within the risk threshold probability, the control circuit 102 may determine a power requirement for each of a plurality of remediation options determined at step 210. In one configuration, the control circuit 102 may determine which particular remediation option of the plurality of remediation options provides a second confidence value of sufficient power remaining that falls within the risk threshold probability. By one approach, the second confidence value of sufficient power remaining may be based at least on the power required by the temperature control mechanism 122 in maintaining the temperature of the volume of the chamber 118 within the at least one climate threshold value. By another approach, in response to determining that the particular remediation option is not available, the control circuit 102 may provide a no-go signal (e.g., an exception handling signal) to the central control circuit 126 as described in step 408. In one configuration, the control circuit 102 may receive a second mission from the central control circuit 126 in response to providing the no-go signal to the central control circuit 126. By one approach, the control circuit 102 may replace the first mission with the second mission in response to a determination that a second confidence value of sufficient power remaining is within the risk threshold probability. In such an approach, the determination may be based, at least, on power required by the temperature control mechanism 122 to maintain the temperature of the volume of the chamber 118 within a second climate threshold value of one or more products associated with the second mission. As such, the control circuit 102 may initiate supply of power to the rotor 110 in response to the replacement of the first mission with the second mission.

By another approach, the control circuit 102 may periodically determine a voltage level of the power supply 108 during a delivery of the at least one product. In one configuration, the control circuit 102 may determine a second confidence value of sufficient power remaining based on the voltage level. In another configuration, the control circuit 102 may compare whether the second confidence value of sufficient power remaining is within the risk threshold probability that the first mission of the autonomous UAS 104 will be completed.

By another approach, the control circuit 102 may initiate intermittent supply of power to the temperature control mechanism 122 to conserve power usage of the autonomous UAS 104. In such an approach, the intermittent supply of power may be initiated, by the control circuit 102, based on the temperature of the volume of the chamber 118 reaching a particular temperature threshold.

By another approach, the control circuit 102 may determine temperature control data based on the at least one climate threshold value associated with the product identifier data. In one configuration, the control circuit 102 may transmit, via the wireless transceiver 112, the temperature control data to the temperature control mechanism 122 of the climate controlled product chamber 116 to instruct the temperature control mechanism 122 to maintain climate of the climate controlled product chamber 116 within the at least one climate threshold value.

In some embodiments, the autonomous UAS 104 may comprise a plurality of solar panels 114 that may provide additional power to the power required by the temperature control mechanism 122 to maintain the temperature of the volume of the chamber 118 within the at least one climate threshold value in response to the second confidence value of sufficient power remaining not being within the risk threshold probability. In some embodiments, the mothership UAS 124 may comprise a docking bay that may receive and/or couple the autonomous UAS 104 to the mothership UAS 124. By one approach, the mothership UAS 124 may recharge the power supply 108 of the autonomous UAS 104 when the autonomous UAS 104 is at the docking bay in response to the second confidence value of sufficient power remaining not being within the risk threshold probability. By another approach, the mothership UAS 124 may correspond to an intermediate manager of a plurality of autonomous UAS. The mothership UAS 124 may at least include one or more sensors. In one configuration, the mothership UAS 124 may process data, provide communications services, and/or coordinate and/or delegate multiple missions and resources to the plurality of autonomous UAS. The assigned multiple missions and/or resources may be received from the central control circuit 126. In another configuration, the mothership UAS 124 may relay operational and/or mission status of the plurality of autonomous UAS to the central control circuit 126. In some embodiments, the control circuit 102 may correspond to a plurality of control circuits associated with the central control circuit 126, the mothership UAS 124, and the autonomous UAS 104 that collaboratively cooperate and/or function as a single control circuit.

Figure 5:
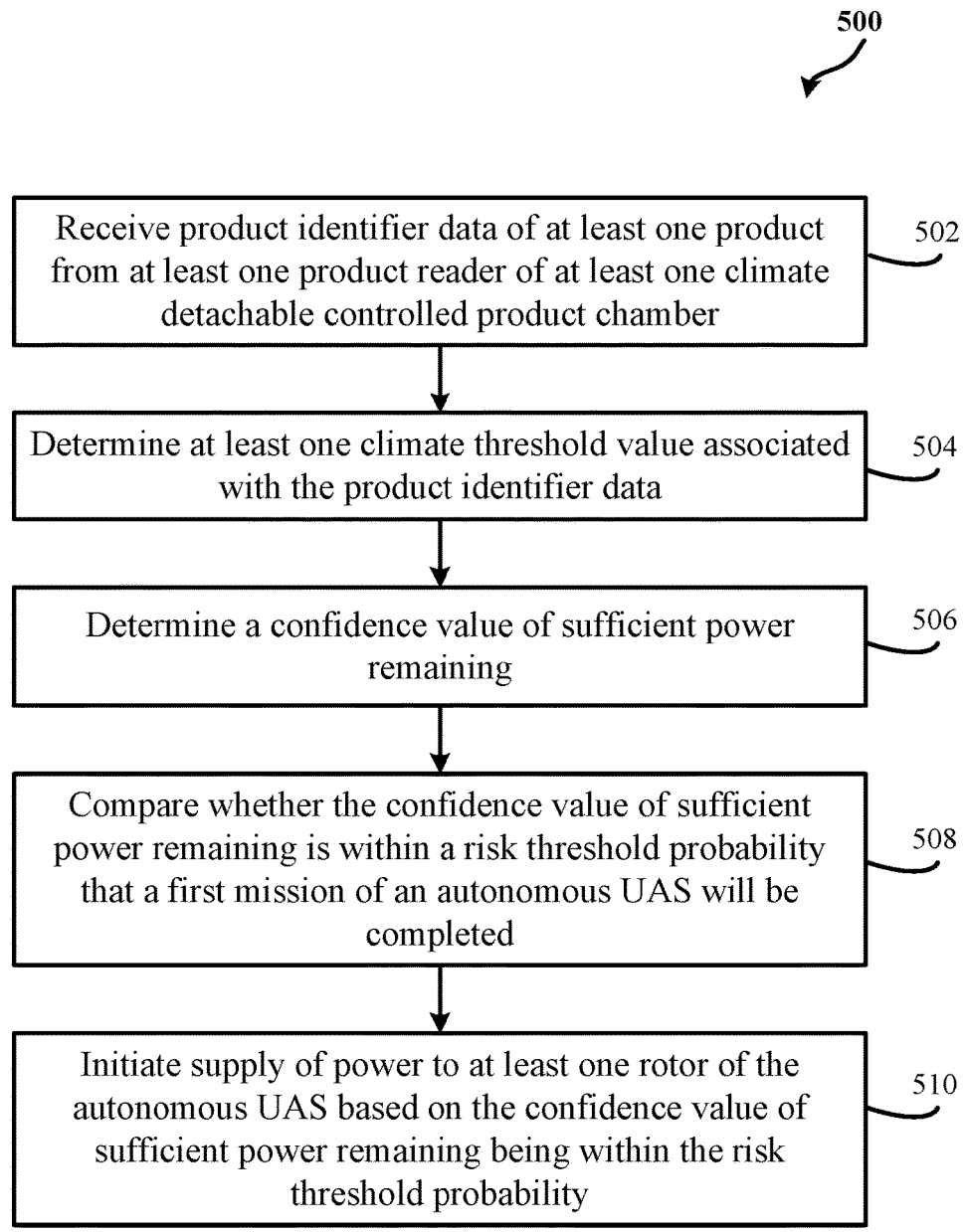
FIG. 5 is an exemplary flow diagram of a process for delivering climate controlled product via at least one autonomous UAS in accordance with some embodiments.

FIG. 5 illustrates an exemplary flow diagram of a method 500 for delivering climate controlled product via at least one autonomous UAS, in accordance with some embodiments. By one approach, the method 500 may be implemented in the system 100 of FIG. 1. By another approach, one or more steps of method 500 may be implemented in the autonomous UAS 104, the control circuit 102, the central control circuit 126, the climate controlled product chamber 116, the temperature control mechanism 122, and/or the mothership UAS 124 of FIG. 1. By another approach, the method 500 and/or one or more steps of the method may optionally be included in and/or performed in cooperation with the method 400 of FIG. 4, the method 300 of FIG. 3, and/or the method 200 of FIG. 2.

The method 500 includes, at step 502, receiving product identifier data of at least one product from at least one product reader of at least one climate detachable controlled product chamber. For example, the at least one climate detachable controlled product chamber may correspond to the climate detachable controlled product chamber 116. In one configuration, the at least one climate detachable controlled product chamber may comprise a chamber having a volume that may hold the at least one product. The method 500 may include determining at least one climate threshold value associated with the product identifier data, at step 504. By another approach, the method 500 may include, at step 506, determining a confidence value of sufficient power remaining based at least on power usage expected by a temperature control mechanism of the at least one climate detachable controlled product chamber to maintain a temperature of the volume of the chamber within the at least one climate threshold value during delivery to a delivery location. By another approach, the method 500 may include, at step 508, comparing whether the confidence value of sufficient power remaining is within a risk threshold probability that a first mission of an autonomous UAS will be completed. For example, the autonomous UAS may correspond to the autonomous UAS 104 of FIG. 1. By yet another approach, the method 500 may include initiating supply of power to at least one rotor of the autonomous UAS based on the confidence value of sufficient power remaining being within the risk threshold probability, at step 510. In one configuration, the risk threshold probability may be based on a business criteria received from a central control circuit communicatively coupled with and external to the autonomous UAS. For example, the central control circuit may correspond to the central control circuit 126 of FIG. 1.

Figure 6:
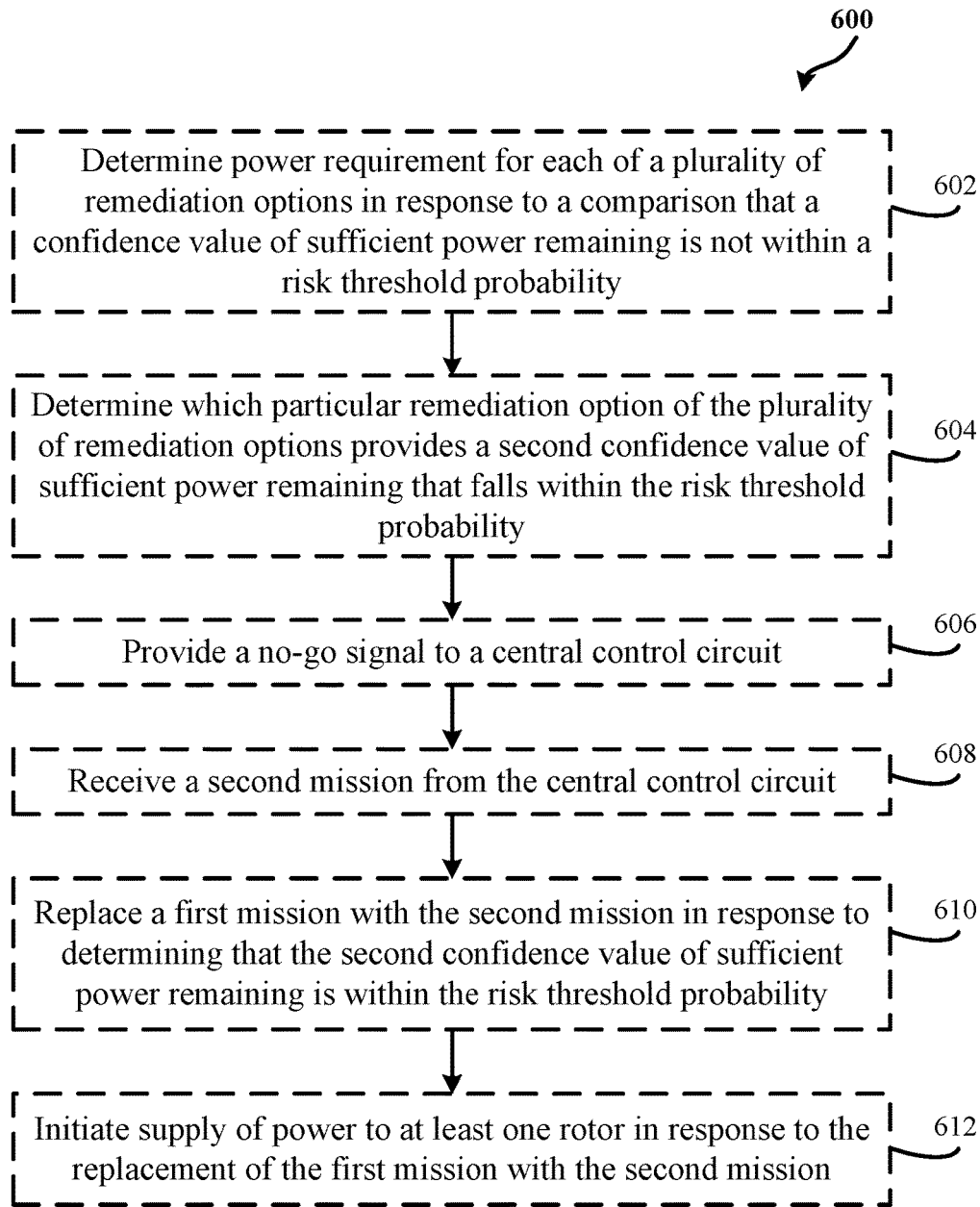
FIG. 6 is an exemplary flow diagram of a process for delivering climate controlled product via at least one autonomous UAS in accordance with some embodiments.

FIG. 6 illustrates an exemplary flow diagram of a method 600 for delivering climate controlled product via at least one autonomous UAS, in accordance with some embodiments. By one approach, the method 600 may be implemented in the system 100 of FIG. 1. By another approach, one or more steps of method 600 may be implemented in the autonomous UAS 104, the control circuit 102, the central control circuit 126, the climate controlled product chamber 116, the temperature control mechanism 122, and/or the mothership UAS 124 of FIG. 1. By another approach, the method 600 and/or one or more steps of the method may optionally be included in and/or performed in cooperation with the method 500 of FIG. 5, the method 400 of FIG. 4, the method 300 of FIG. 3, and/or the method 200 of FIG. 2. The method 600 includes, at step 602, determining a power requirement for each of a plurality of remediation options in response to the comparison that the confidence value of sufficient power remaining is not within the risk threshold probability. In one configuration, the method 600 may include, at step 604 determining which particular remediation option of the plurality of remediation options may provide a second confidence value of sufficient power remaining that falls within the risk threshold probability. In such a configuration, the second confidence value of sufficient power remaining may be based, at least, on the power required by the temperature control mechanism in maintaining the temperature of the volume of the chamber within the at least one climate threshold value. For example, the temperature control mechanism may correspond to the temperature control mechanism 122 of FIG. 1.

In some embodiments, the method 600 may include, at step 606, providing a no-go signal to a central control circuit that may be communicatively coupled and external to the autonomous UAS in response to determining that the particular remediation option is not available. By one approach, the method 600 may include, at step 608, receiving a second mission from the central control circuit. By another approach, the method 600 may include replacing the first mission with the second mission in response to determining that a second confidence value of sufficient power remaining is within the risk threshold probability, at step 610. In such an approach, the determination may be based, at least, on power required by the temperature control mechanism to maintain the temperature of the volume of chamber within a second climate threshold value of one or more products associated with the second mission. By another approach, the method 600 may include, at step 612, initiating supply of power to the at least one rotor in response the replacement of the first with the second mission. For example, the control circuit 102 of FIG. 1 may initiate supply of power to the rotor 110 of FIG. 1 via the power supply 108 of FIG. 1.

Figure 7:
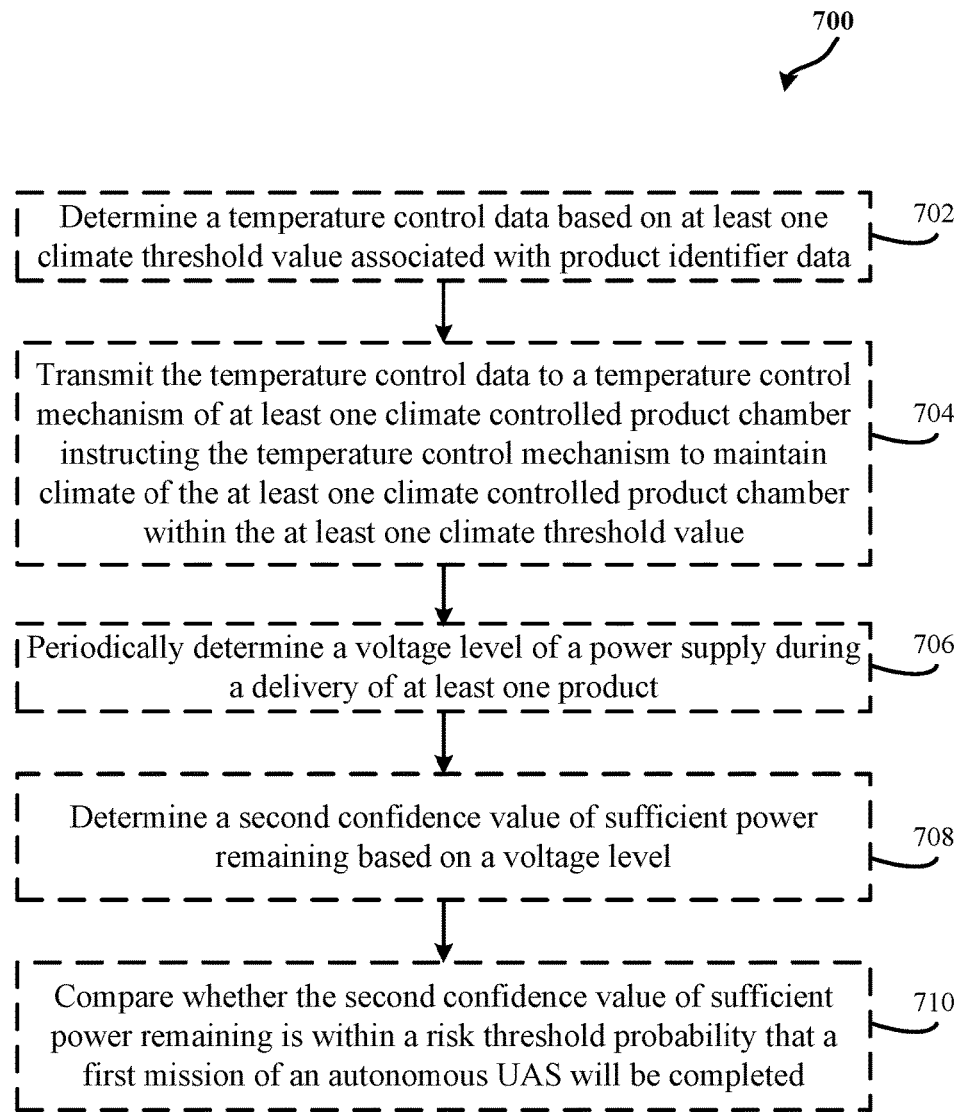
FIG. 7 is an exemplary flow diagram of a process for delivering climate controlled product via at least one autonomous UAS in accordance with some embodiments.

FIG. 7 illustrates an exemplary flow diagram of a method 700 for delivering climate controlled product via at least one autonomous UAS, in accordance with some embodiments. By one approach, the method 700 may be implemented in the system 100 of FIG. 1. By another approach, one or more steps of method 700 may be implemented in the autonomous UAS 104, the control circuit 102, the central control circuit 126, the climate controlled product chamber 116, the temperature control mechanism 122, and/or the mothership UAS 124 of FIG. 1. By another approach, the method 700 and/or one or more steps of the method may optionally be included in and/or performed in cooperation with the method 600 of FIG. 6, the method 500 of FIG. 5, the method 400 of FIG. 4, the method 300 of FIG. 3, and/or the method 200 of FIG. 2. The method 700 includes, at step 702, determining a temperature control data based on the at least one climate threshold value associated with the product identifier data. By one approach, the method 700 may include, at step 704, transmitting the temperature control data to the temperature control mechanism of the at least one climate controlled product chamber. In one configuration, the temperature control data may comprise data that instructs the temperature control mechanism to maintain climate of the at least one climate controlled product chamber within the at least one climate threshold value. By another approach, the method 700 may include, at step 706, periodically determining a voltage level of the power supply during a delivery of the at least one product. By another approach, the method 700 may include determining a second confidence value of sufficient power remaining based on the voltage level, at step 708. In such an approach, the method 700 may include, at step 710, comparing whether the second confidence value of sufficient power remaining is within the risk threshold probability that the first mission of the autonomous UAS will be completed.

Figure 8:
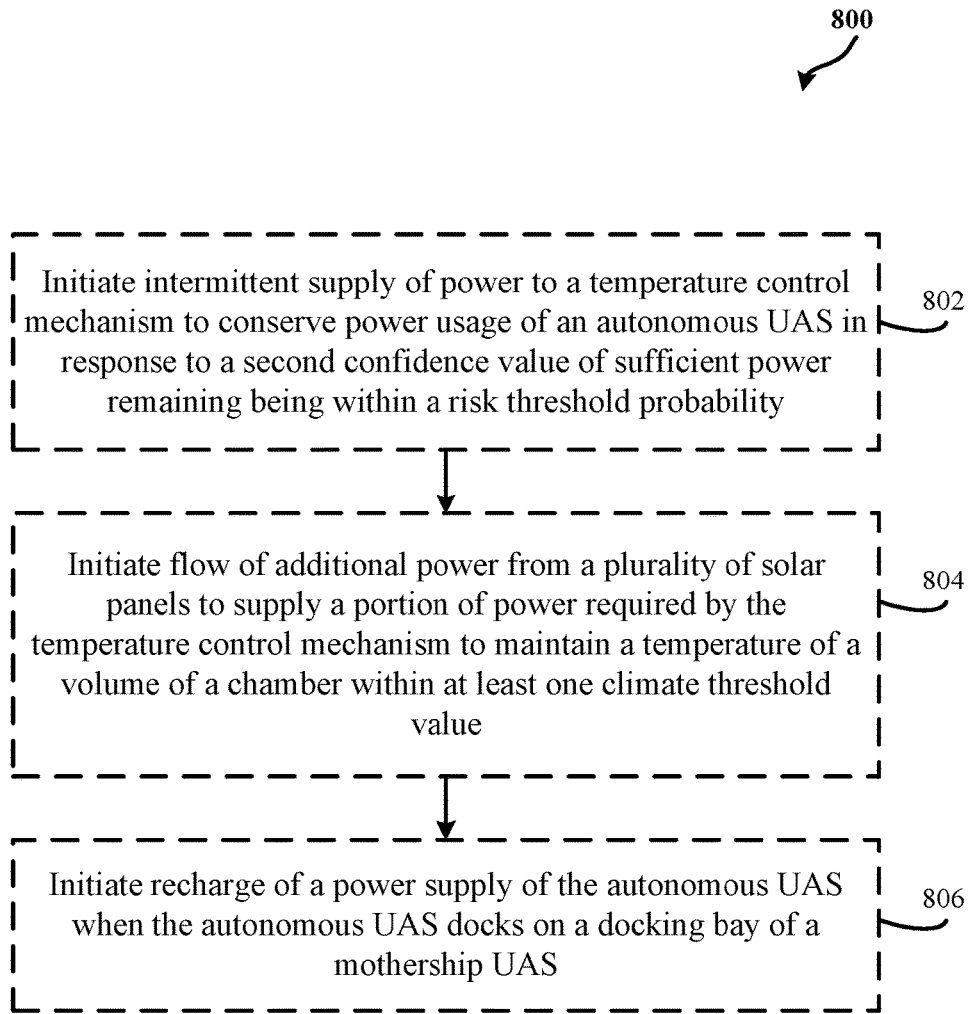
FIG. 8 is an exemplary flow diagram of a process for delivering climate controlled product via at least one autonomous UAS in accordance with some embodiments.

FIG. 8 illustrates an exemplary flow diagram of a method 800 for delivering climate controlled product via at least one autonomous UAS, in accordance with some embodiments. By one approach, the method 800 may be implemented in the system 100 of FIG. 1. By another approach, one or more steps of method 800 may be implemented in the autonomous UAS 104, the control circuit 102, the central control circuit 126, the climate controlled product chamber 116, the temperature control mechanism 122, and/or the mothership UAS 124 of FIG. 1. By another approach, the method 800 and/or one or more steps of the method may optionally be included in and/or performed in cooperation with the method 700 of FIG. 7, the method 600 of FIG. 6, the method 500 of FIG. 5, the method 400 of FIG. 4, the method 300 of FIG. 3, and/or the method 200 of FIG. 2. The method 800 includes, at step 802, initiating intermittent supply of power to the temperature control mechanism to conserve power usage of the autonomous UAS in response to the second confidence value of sufficient power remaining being within the risk threshold probability. In one configuration, the intermittent supply of power may be initiated based on the temperature of the volume of the chamber reaching a particular temperature threshold. In some embodiments, the method 800 may include, at step 804, initiating flow of additional power from a plurality of solar panels to supply a portion of the power required by the temperature control mechanism to maintain the temperature of the volume of the chamber within the at least one climate threshold value in response to the second confidence value of sufficient power remaining not being within the risk threshold probability. In yet some embodiments, the method 800 may include, at step 806, initiating recharge of the power supply of the autonomous UAS when the autonomous UAS docks on a docking bay of a mothership UAS in response to the second confidence value of sufficient power remaining not being within the risk threshold probability. For example, the mothership UAS may correspond to the mothership UAS 124 of FIG. 1.

Figure 9:
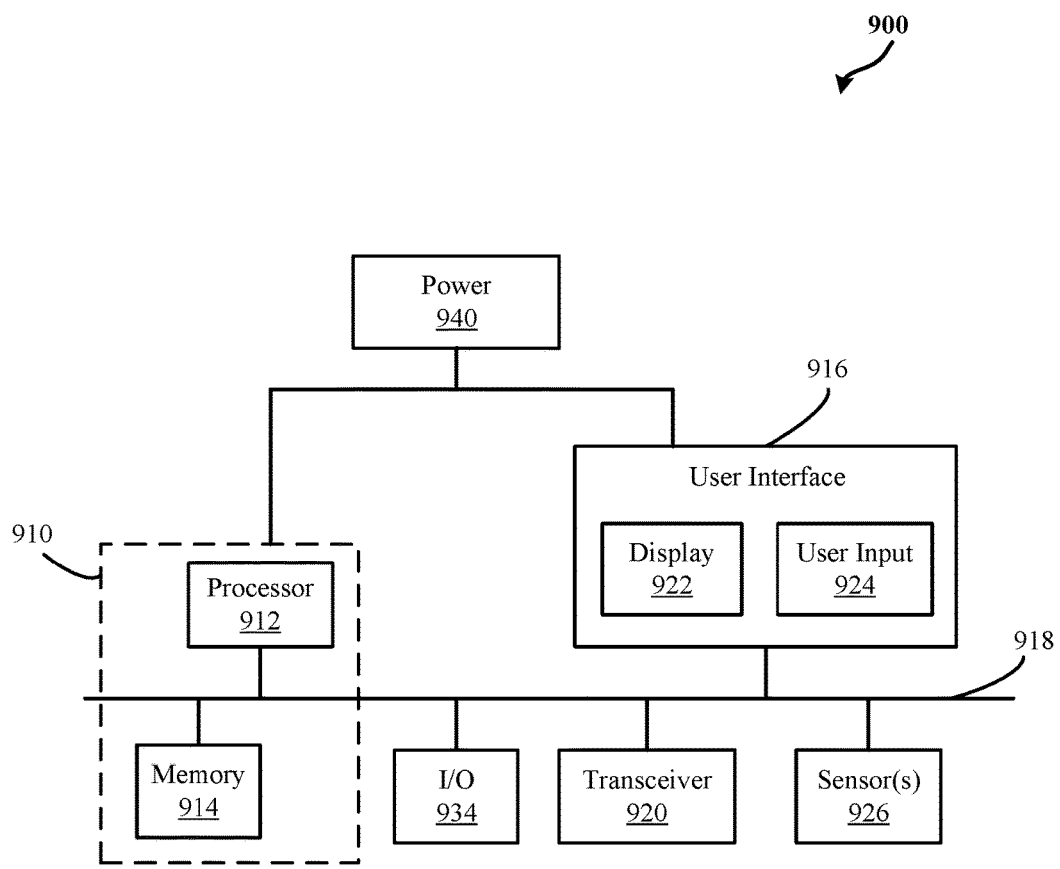
FIG. 9 illustrates an exemplary system for use in implementing systems, apparatuses, devices, methods, techniques, and the like in delivering climate controlled product via at least one autonomous UAS in accordance with several embodiments.

Further, the circuits, circuitry, systems, devices, processes, methods, techniques, functionality, services, servers, sources and the like described herein may be utilized, implemented and/or run on many different types of devices and/or systems. FIG. 9 illustrates an exemplary system 900 that may be used for implementing any of the components, circuits, circuitry, systems, functionality, apparatuses, processes, or devices of the system 100 of FIG. 1, the method 800 of FIG. 8, the method 700 of FIG. 7, the method 600 of FIG. 6, the method 500 of FIG. 5, the method 400 of FIG. 4, the method 300 of FIG. 3, the method 200 of FIG. 2, and/or other above or below mentioned systems or devices, or parts of such circuits, circuitry, functionality, systems, apparatuses, processes, or devices. For example, the system 900 may be used to implement some or all of the system for delivering climate controlled product via the at least one autonomous UAS 104, the climate controlled product chamber 116, the temperature control mechanism 122, the product reader 120, package coupler 106, the rotor 110, the power supply 108, the wireless transceiver 112, the control circuit 102, the solar panels 114, the central control circuit 126, the mothership UAS 124, the database 128, and/or other such components, circuitry, functionality and/or devices. However, the use of the system 900 or any portion thereof is certainly not required.

By way of example, the system 900 may comprise a processor module (or a control circuit) 912, memory 914, and one or more communication links, paths, buses or the like 918. Some embodiments may include one or more user interfaces 916, and/or one or more internal and/or external power sources or supplies 940. The control circuit 912 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 912 can be part of control circuitry and/or a control system 910, which may be implemented through one or more processors with access to one or more memory 914 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 900 may be used to implement one or more of the above or below, or parts of, components, circuits, systems, processes and the like. For example, the system 900 may implement the system for delivering climate controlled product via at least one autonomous UAS 104 with the control circuit 102 being the control circuit 912.

The user interface 916 can allow a user to interact with the system 900 and receive information through the system. In some instances, the user interface 916 includes a display 922 and/or one or more user inputs 924, such as buttons, touch screen, track ball, keyboard, mouse, etc., which can be part of or wired or wirelessly coupled with the system 900. Typically, the system 900 further includes one or more communication interfaces, ports, transceivers 920 and the like allowing the system 900 to communicate over a communication bus, a distributed computer and/or communication network (e.g., a local area network (LAN), the Internet, wide area network (WAN), etc.), communication link 918, other networks or communication channels with other devices and/or other such communications or combination of two or more of such communication methods. Further the transceiver 920 can be configured for wired, wireless, optical, fiber optical cable, satellite, or other such communication configurations or combinations of two or more of such communications. Some embodiments include one or more input/output (I/O) interface 934 that allow one or more devices to couple with the system 900. The I/O interface can be substantially any relevant port or combinations of ports, such as but not limited to USB, Ethernet, or other such ports.

The I/O interface 934 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 926 to provide information to the system and/or sensor information that is communicated to another component, such as the central control system, a portable retail container, a vehicle associated with the portable retail container, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 900 comprises an example of a control and/or processor-based system with the control circuit 912. Again, the control circuit 912 can be implemented through one or more processors, controllers, central processing units, logic, software and the like. Further, in some implementations the control circuit 912 may provide multiprocessor functionality.

The memory 914, which can be accessed by the control circuit 912, typically includes one or more processor readable and/or computer readable media accessed by at least the control circuit 912, and can include volatile and/or nonvolatile media, such as RAM, ROM, EEPROM, flash memory and/or other memory technology. Further, the memory 914 is shown as internal to the control system 910; however, the memory 914 can be internal, external or a combination of internal and external memory. Similarly, some or all of the memory 914 can be internal, external or a combination of internal and external memory of the control circuit 912. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 914 can store code, software, executables, scripts, data, content, lists, programming, programs, log or history data, user information, customer information, product information, and the like. While FIG. 9 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for delivering climate controlled product via at least one autonomous unmanned aircraft system (UAS) that self-evaluates power sufficiency based on temperature tolerance of at least one product, the system comprising:
   an autonomous UAS comprising:
      a control circuit configured to operate the autonomous UAS;
      at least one rotor that provides lift to enable the autonomous UAS to fly;
      a power supply configured to supply power to at least one of climate controlled product chamber and the at least one rotor; and
      a package coupler; and
   the at least one climate controlled product chamber detachably connectable to the package coupler, the at least one climate controlled product chamber comprising:
      a chamber having a volume configured to hold at least one product;
      at least one product reader configured to capture product identifier data associated with the at least one product; and
      a temperature control mechanism coupled to the power supply when the at least one climate controlled product chamber is connected to the package coupler, the temperature control mechanism configured to maintain a temperature of the volume of the chamber;
   wherein the control circuit is configured to:
      receive the product identifier data from the at least one product reader;
      determine at least one climate threshold value associated with the product identifier data;
      determine a confidence value of sufficient power remaining based at least on power usage expected by the temperature control mechanism to maintain the temperature of the volume of the chamber within the at least one climate threshold value during a delivery to a delivery location based on flight plan data;
      compare whether the confidence value of sufficient power remaining is within a risk threshold probability that a first mission of the autonomous UAS will be completed; and
      initiate supply of power to the at least one rotor based on the confidence value of sufficient power remaining being within the risk threshold probability.

2. The system of claim 1, wherein the risk threshold probability is based on a business criteria received from a central control circuit communicatively coupled with and external to the autonomous UAS.

3. The system of claim 1, wherein the control circuit is further configured to:
   determine a power requirement for each of a plurality of remediation options in response to the comparison that the confidence value of sufficient power remaining is not within the risk threshold probability; and
   determine which particular remediation option of the plurality of remediation options provides a second confidence value of sufficient power remaining that falls within the risk threshold probability, wherein the second confidence value of sufficient power remaining is based at least on the power required by the temperature control mechanism in maintaining the temperature of the volume of the chamber within the at least one climate threshold value.

4. The system of claim 3, wherein the control circuit is further configured to:
in response to determining that the particular remediation option is not available, provide a no-go signal to a central control circuit communicatively coupled and external to the autonomous UAS;
receive a second mission from the central control circuit;
replace the first mission with the second mission in response to a determination that the second confidence value of sufficient power remaining is within the risk threshold probability, wherein the determination is based at least on power required by the temperature control mechanism to maintain the temperature of the volume of the chamber within a second climate threshold value of one or more products associated with the second mission; and
initiate supply of power to the at least one rotor in response to the replacement of the first mission with the second mission.

5. The system of claim 1, wherein the autonomous UAS further comprises a wireless transceiver coupled to the control circuit, and wherein the control circuit is further configured to:
determine temperature control data based on the at least one climate threshold value associated with the product identifier data; and
transmit, via the wireless transceiver, the temperature control data to the temperature control mechanism of the at least one climate controlled product chamber to instruct the temperature control mechanism to maintain climate of the at least one climate controlled product chamber within the at least one climate threshold value.

6. The system of claim 1, wherein the control circuit is further configured to:
periodically determine a voltage level of the power supply during a delivery of the at least one product;
determine a second confidence value of sufficient power remaining based on the voltage level; and
compare whether the second confidence value of sufficient power remaining is within the risk threshold probability that the first mission of the autonomous UAS will be completed.

7. The system of claim 6, wherein the control circuit is further configured to initiate intermittent supply of power to the temperature control mechanism to conserve power usage of the autonomous UAS.

8. The system of claim 7, wherein the intermittent supply of power is initiated based on the temperature of the volume of the chamber reaching a particular temperature threshold.

9. The system of claim 6, wherein the autonomous UAS further comprises a plurality of solar panels configured to provide additional power to the power required by the temperature control mechanism to maintain the temperature of the volume of the chamber within the at least one climate threshold value in response to the second confidence value of sufficient power remaining not being within the risk threshold probability.

10. The system of claim 6, further comprising a mothership UAS communicatively coupled to the autonomous UAS, the mothership UAS comprising a docking bay configured to receive and couple the autonomous UAS to the mothership UAS, wherein mothership UAS is configured to recharge the power supply of the autonomous UAS when the autonomous UAS is at the docking bay in response to the second confidence value of sufficient power remaining not being within the risk threshold probability.

11. A method for delivering climate controlled product by an autonomous unmanned aircraft system (UAS), the autonomous UAS configured to self-evaluate power sufficiency based on temperature tolerance of at least one product comprising:
receiving product identifier data of at least one product from at least one product reader of at least one climate detachable controlled product chamber, wherein the at least one climate detachable controlled product chamber comprising a chamber having a volume configured to hold the at least one product;
determining at least one climate threshold value associated with the product identifier data;
determining a confidence value of sufficient power remaining based at least on power usage expected by a temperature control mechanism of the at least one climate detachable controlled product chamber to maintain a temperature of the volume of the chamber within the at least one climate threshold value during delivery to a delivery location;
comparing whether the confidence value of sufficient power remaining is within a risk threshold probability that a first mission of an autonomous UAS will be completed; and
initiating supply of power to at least one rotor of the autonomous UAS based on the confidence value of sufficient power remaining being within the risk threshold probability.

12. The method of claim 11, wherein the risk threshold probability is based on a business criteria received from a central control circuit communicatively coupled with and external to the autonomous UAS.

13. The method of claim 11, further comprising:
determining a power requirement for each of a plurality of remediation options in response to the comparison that the confidence value of sufficient power remaining is not within the risk threshold probability; and
determining which particular remediation option of the plurality of remediation options provides a second confidence value of sufficient power remaining that falls within the risk threshold probability, wherein the second confidence value of sufficient power remaining is based at least on the power required by the temperature control mechanism in maintaining the temperature of the volume of the chamber within the at least one climate threshold value.

14. The method of claim 13, further comprising:
in response to determining that the particular remediation option is not available, providing a no-go signal to a central control circuit that is communicatively coupled and external to the autonomous UAS;
receiving a second mission from the central control circuit;
replacing the first mission with the second mission in response to determining that the second confidence value of sufficient power remaining is within the risk threshold probability, wherein the determination is based at least on power required by the temperature control mechanism to maintain the temperature of the volume of the chamber within a second climate threshold value of one or more products associated with the second mission; and
initiating supply of power to the at least one rotor in response to the replacement of the first mission with the second mission.

15. The method of claim 11, further comprising:
   determining temperature control data based on the at least one climate threshold value associated with the product identifier data; and
   transmitting, via a wireless transceiver of the autonomous UAS, the temperature control data to the temperature control mechanism of the at least one climate controlled product chamber instructing the temperature control mechanism to maintain climate of the at least one climate controlled product chamber within the at least one climate threshold value.

16. The method of claim 11, further comprising:
   periodically determining a voltage level of a power supply during a delivery of the at least one product;
   determining a second confidence value of sufficient power remaining based on the voltage level; and
   comparing whether the second confidence value of sufficient power remaining is within the risk threshold probability that the first mission of the autonomous UAS will be completed.

17. The method of claim 16, further comprising, in response to the second confidence value of sufficient power remaining being within the risk threshold probability, initiating intermittent supply of power to the temperature control mechanism to conserve power usage of the autonomous UAS.

18. The method of claim 17, wherein the intermittent supply of power is initiated based on the temperature of the volume of the chamber reaching a particular temperature threshold.

19. The method of claim 16, further comprising initiating flow of additional power from a plurality of solar panels to supply a portion of the power required by the temperature control mechanism to maintain the temperature of the volume of the chamber within the at least one climate threshold value in response to the second confidence value of sufficient power remaining not being within the risk threshold probability.

20. The method of claim 16, further comprising initiating recharge of the power supply of the autonomous UAS when the autonomous UAS docks on a docking bay of a mothership UAS in response to the second confidence value of sufficient power remaining not being within the risk threshold probability.

* * * * *